US007168076B2

(12) United States Patent
Chaudhry et al.

(10) Patent No.: US 7,168,076 B2
(45) Date of Patent: *Jan. 23, 2007

(54) FACILITATING EFFICIENT JOIN OPERATIONS BETWEEN A HEAD THREAD AND A SPECULATIVE THREAD

(75) Inventors: Shailender Chaudhry, San Francisco, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 697 days.

This patent is subject to a terminal disclaimer.

(21) Appl. No.: 10/194,911

(22) Filed: Jul. 12, 2002

(65) Prior Publication Data

US 2003/0018826 A1      Jan. 23, 2003

Related U.S. Application Data

(60) Provisional application No. 60/305,470, filed on Jul. 13, 2001.

(51) Int. Cl.
*G06F 9/00* (2006.01)

(52) U.S. Cl. .................. 718/106; 712/237; 712/239

(58) Field of Classification Search ........ 718/100–108; 712/233–248; 717/136–161
See application file for complete search history.

(56) References Cited

U.S. PATENT DOCUMENTS 5,812,811 A * 9/1998 Dubey et al. ............... 712/216

(Continued)

FOREIGN PATENT DOCUMENTS

EP      0 725 334 A1    8/1996

(Continued)

OTHER PUBLICATIONS

Publication entitled "Expoloiting Method-Level Parallelism in Single-Threaded Java Programs", by Michael K. Chen et al., 1998 IEEE, pp. 176-184.

(Continued)

*Primary Examiner*—William Thomson
*Assistant Examiner*—Charles Anya
(74) *Attorney, Agent, or Firm*—Park, Vaughan & Fleming, LLP

(57) ABSTRACT

One embodiment of the present invention provides a system that facilitates efficient join operations between a head thread and a speculative thread during speculative program execution, wherein the head thread executes program instructions and the speculative thread executes program instructions in advance of the head thread. The system operates by executing a primary version of a program using the head thread, and by executing a speculative version of the program using the speculative thread. When the head thread reaches a point in the program where the speculative thread began executing, the system performs a join operation between the head thread and the speculative thread. This join operation causes the speculative thread to act as a new head thread by switching from executing the speculative version of the program to executing the primary version of the program. To facilitate this switching operation, the system performs a lookup to determine where the new head thread is to commence executing within the primary version of the program based upon where the speculative thread is currently executing within the speculative version of the program.

21 Claims, 9 Drawing Sheets

U.S. PATENT DOCUMENTS

| | | | | |
|---|---|---|---|---|
| 6,049,673 | A * | 4/2000 | McComb et al. | 717/164 |
| 6,658,451 | B1 * | 12/2003 | Chaudhry et al. | 718/108 |
| 2002/0055964 | A1 * | 5/2002 | Luk et al. | 709/107 |
| 2004/0154011 | A1 * | 8/2004 | Wang et al. | 717/158 |
| 2005/0125645 | A1 * | 6/2005 | Rudd et al. | 712/239 |

FOREIGN PATENT DOCUMENTS

| | | |
|---|---|---|
| WO | 00/70451 | 11/2000 |

OTHER PUBLICATIONS

Publication entitled "Single-Program Speculative Multithreading (SPSM Architecture: Compiler-Assisted Fine-Grained Multithreading", by Pradeep K. Dubey et al., XP-008003494, Parallel Architectures and Compilation Techniques (PACT 1995), 1998 pp. 109-121.

\* cited by examiner

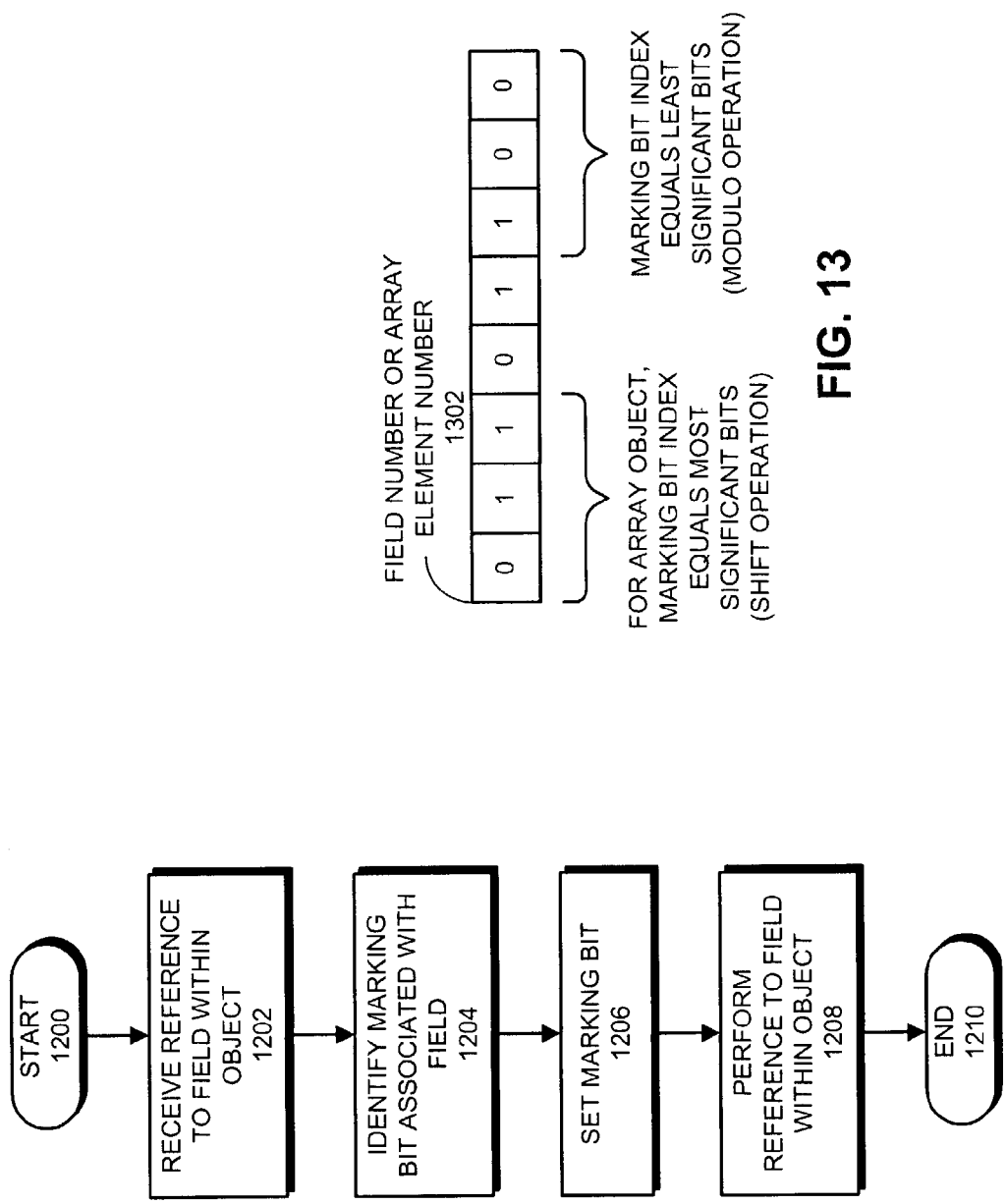

FACILITATING EFFICIENT JOIN OPERATIONS BETWEEN A HEAD THREAD AND A SPECULATIVE THREAD

RELATED APPLICATION

This application hereby claims priority under 35 U.S.C. §119 to U.S. Provisional Patent Application No. 60/305,470, filed on Jul. 13, 2001, entitled "Facilitating Efficient Join Operations Between a Head Thread and a Speculative Thread," by inventors Shailender Chaudhry and Marc Tremblay.

BACKGROUND

1. Field of the Invention

The present invention relates to techniques for improving computer system performance. More specifically, the present invention relates to a method and apparatus that facilitates efficient join operations between a head thread and a speculative thread in a system that supports speculative program execution.

2. Related Art

As increasing semiconductor integration densities allow more transistors to be integrated onto a microprocessor chip, computer designers are investigating different methods of using these transistors to increase computer system performance. Some recent computer architectures exploit "instruction level parallelism," in which a single central processing unit (CPU) issues multiple instructions in a single cycle. Given proper compiler support, instruction level parallelism has proven effective at increasing computational performance across a wide range of computational tasks. However, inter-instruction dependencies generally limit the performance gains realized from using instruction level parallelism to a factor of two or three.

Another method for increasing computational speed is "speculative execution" in which a processor executes multiple branch paths simultaneously, or predicts a branch, so that the processor can continue executing without waiting for the result of the branch operation. By reducing dependencies on branch conditions, speculative execution can increase the total number of instructions issued.

Unfortunately, conventional speculative execution typically provides a limited performance improvement because only a small number of instructions can be speculatively executed. One reason for this limitation is that conventional speculative execution is typically performed at the basic block level, and basic blocks tend to include only a small number of instructions. Another reason is that conventional hardware structures used to perform speculative execution can only accommodate a small number of speculative instructions.

What is needed is a method and apparatus that facilitates speculative execution of program instructions at a higher level of granularity so that many more instructions can be speculatively executed.

One challenge in designing a system that facilitates speculative execution is to perform a join operation between a head thread and a speculative thread when the head thread reaches a point in the program where the speculative thread began executing. If this join operation is not performed efficiently, much of the speedup gained by the speculative execution can be lost.

What is needed is a method and apparatus that facilitates efficient join operations between a head thread and a speculative thread to support speculative program execution.

SUMMARY

One embodiment of the present invention provides a system that facilitates efficient join operations between a head thread and a speculative thread during speculative program execution, wherein the head thread executes program instructions and the speculative thread executes program instructions in advance of the head thread. The system operates by executing a primary version of a program using the head thread, and by executing a speculative version of the program using the speculative thread. When the head thread reaches a point in the program where the speculative thread began executing, the system performs a join operation between the head thread and the speculative thread. This join operation causes the speculative thread to act as a new head thread by switching from executing the speculative version of the program to executing the primary version of the program. To facilitate this switching operation, the system performs a lookup to determine where the new head thread is to commence executing within the primary version of the program based upon where the speculative thread is currently executing within the speculative version of the program.

In one embodiment of the present invention, performing the switching operation involves allowing the speculative thread to continue executing until it reaches a predetermined join point within the speculative version of the program before switching to executing the primary version of the program.

In one embodiment of the present invention, performing the lookup involves performing the lookup in a data structure that identifies locations in the primary version of the program that correspond to locations in the speculative version of the program.

In one embodiment of the present invention, executing the speculative version of the program involves ensuring that the speculative thread uses registers in such a manner that when the switching operation takes place, the new head thread can immediately use data values in the registers without having to move the data values between the registers. In a variation on this embodiment, a register allocator partitions the register file into: (1) a set of registers that are used by the head thread and the speculative thread in the same way; and (2) a set of registers that are used only by the speculative thread.

In one embodiment of the present invention, the head thread operates on primary versions of memory elements and accesses a primary version of a stack. At the same time, the speculative thread operates on space-time dimensioned versions of the memory elements and accesses a speculative version of the stack. In this embodiment, performing the join operation involves, merging the space-time dimensioned versions of the memory elements into the primary versions of the memory elements so that updates to the space-time dimensioned versions of the memory elements are incorporated into corresponding primary versions of memory elements. It also involves merging the speculative version of the stack into the primary version of the stack.

In one embodiment of the present invention, if the speculative thread performs a read operation to a memory element, the system determines if the space-time dimensioned version of the memory element exists. If so, the system reads the space-time dimensioned version of the memory element. On the other hand, if the space-time dimensioned version of the memory element does not exist, the system reads the primary version of the memory element. The system also updates status information associated with the memory element to indicate the memory element has been read by the speculative thread.

In one embodiment of the present invention, if the head thread performs a write operation to a memory element, the system performs the write operation to the primary version of the memory element. The system also checks status information associated with the memory element to determine if the memory element has been read by the speculative thread. If so, the system causes the speculative thread to roll back so that the speculative thread can read a result of the write operation. Otherwise, if the memory element has not been read by the speculative thread, the system performs the write operation to the space-time dimensioned version of the memory element if the space-time dimensioned version exists.

In one embodiment of the present invention, if the speculative thread performs a write operation to a memory element, the system determines if the space-time dimensioned version of the memory element exists. If not, the system creates the space-time dimensioned version of the memory element before performing the write operation to the space-time dimensioned version of the memory element.

In one embodiment of the present invention, the memory elements include objects defined within an object-oriented programming system.

BRIEF DESCRIPTION OF THE FIGURES

FIG. 12 is a flow chart illustrating the process of setting a marking bit associated with a referenced field within an object in accordance with an embodiment of the present invention.

FIG. 13 illustrates how a marking bit number can be determined from a field number or an array element number in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Computer System

Figure 1:
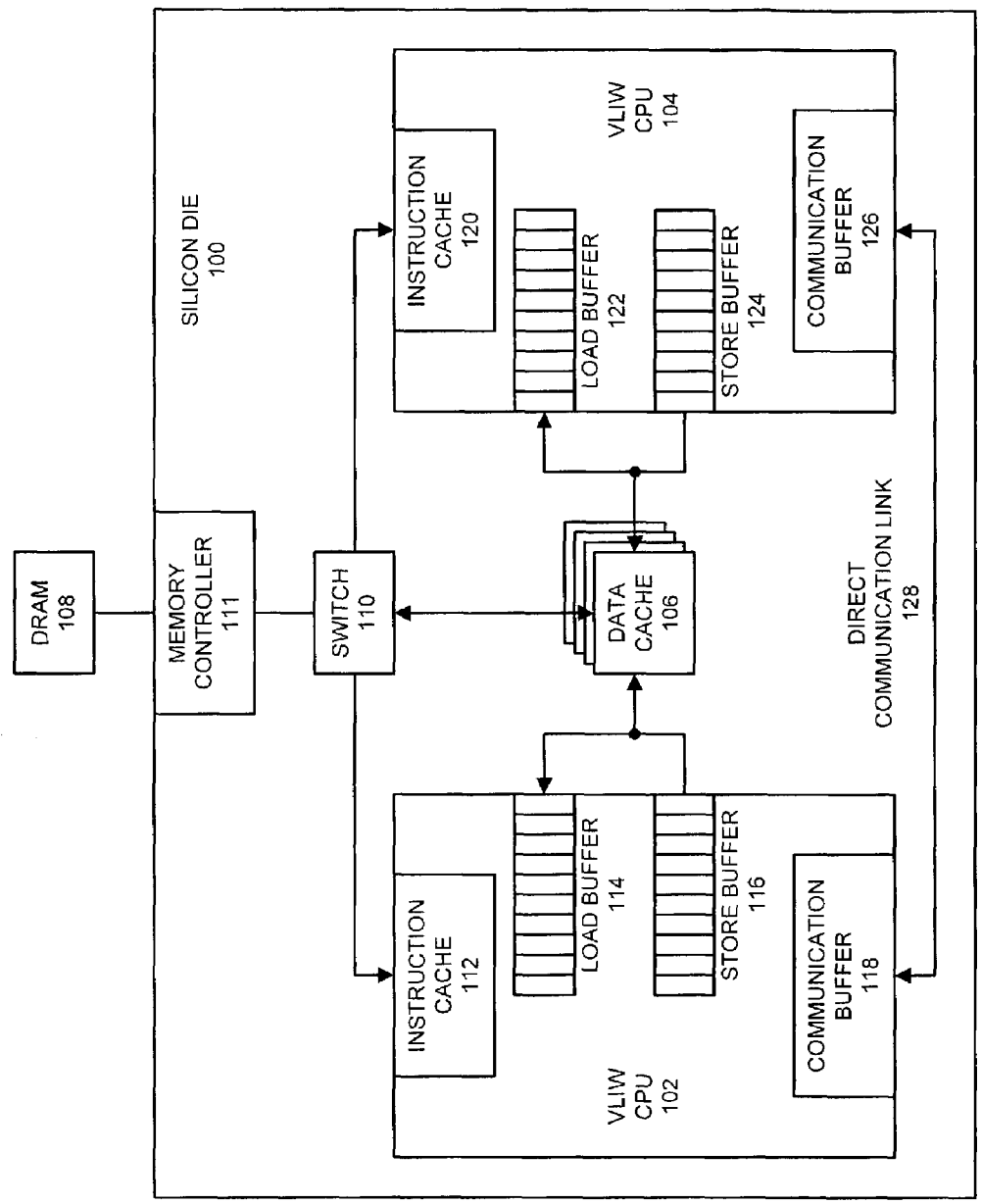
FIG. 1 illustrates a computer system including two central processing units sharing a common data cache in accordance with an embodiment of the present invention.

FIG. 1 illustrates a computer system including two central processing units (CPUs) 102 and 104 sharing a common data cache 106 in accordance with an embodiment of the present invention. In this embodiment, CPUs 102 and 104 and data cache 106 reside on silicon die 100. Note that CPUs 102 and 104 may generally be any type of computational devices that allow multiple threads to execute concurrently. In the embodiment illustrated in FIG. 1, CPUs 102 and 104 are very long instruction word (VLIW) CPUs, which support concurrent execution of multiple instructions executing on multiple functional units. VLIW CPUs 102 and 104 include instruction caches 112 and 120, respectively, containing instructions to be executed by VLIW CPUs 102 and 104.

VLIW CPUs 102 and 104 additionally include load buffers 114 and 122 as well as store buffers 116 and 124 for buffering communications with data cache 106. More specifically, VLIW CPU 102 includes load buffer 114 for buffering loads received from data cache 106, and store buffer 116 for buffering stores to data cache 106. Similarly, VLIW CPU 104 includes load buffer 122 for buffering loads received from data cache 106, and store buffer 124 for buffering stores to data cache 106.

VLIW CPUs 102 and 104 are additionally coupled together by direct communication link 128, which facilitates rapid communication between VLIW CPUs 102 and 104. Note that direct communication link 128 allows VLIW CPU 102 to write into communication buffer 126 within VLIW CPU 104. It also allows VLIW CPU 104 to write into communication buffer 118 within VLIW CPU 102.

In the embodiment illustrated in FIG. 1, Data cache 106 is fully dual-ported allowing concurrent read and/or write accesses from VLIW CPUs 102 and 104. This dual porting eliminates cache coherence delays associated with conventional shared memory architectures that rely on coherent caches.

In one embodiment of the present invention, data cache 106 is a 16K byte 4-way set-associative data cache with 32 byte cache lines.

Data cache 106, instruction caches 112 and instruction cache 120 are coupled through switch 110 to memory controller 111. Memory controller 111 is coupled to dynamic random access memory (DRAM) 108, which is located off chip. Switch 110 may include any type of circuitry for switching signal lines. In one embodiment of the present invention, switch 110 is a cross bar switch.

The present invention generally applies to any computer system that supports concurrent execution by multiple threads and is not limited to the illustrated computing system. However, note that data cache 106 supports fast accesses to shared data items. These fast accesses facilitate efficient sharing of status information between VLIW CPUs 102 and 104 to keep track of accesses to versions of memory objects.

Space-Time Dimensional Execution of Methods

Figure 2A:
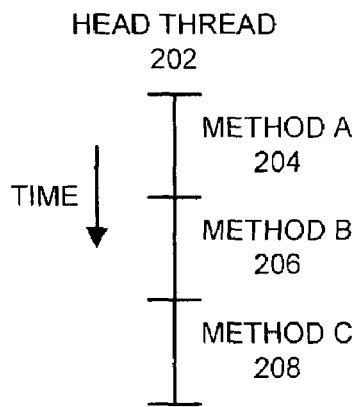
FIG. 2A illustrates sequential execution of methods by a single thread.

FIG. 2A illustrates sequential execution of methods in a conventional computer system by a single head thread 202. In executing a program, head thread 202 executes a number of methods in sequence, including method A 204, method B 206 and method C 208.

Figure 2B:
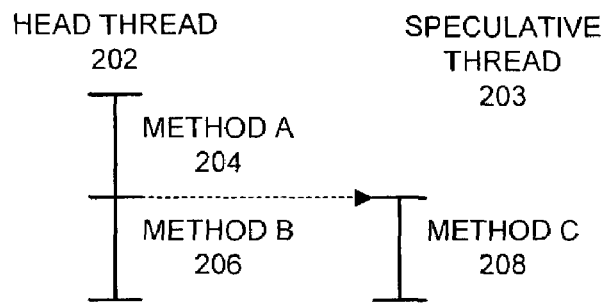
FIG. 2B illustrates space and time dimensional execution of a method in accordance with an embodiment of the present invention.

In contrast, FIG. 2B illustrates space and time dimensional execution of a method in accordance with an embodiment of the present invention. In FIG. 2B, head thread 202 first executes method A 204 and then executes method B 206. (For this example, assume that method B 206 returns a void or some other value that is not used by method C 208. Alternatively, if method C 208 uses a value returned by method B 206, assume that method C 208 uses a predicted return value from method B 206.)

As head thread 202 executes method B 206, speculative thread 203 executes method C 208 in a separate space-time dimension of the heap. If head thread 202 successfully executes method B 206, speculative thread 203 is joined with head thread 202. This join operation involves causing state associated with the speculative thread 203 to be merged with state associated with the head thread 202 and the collapsing of the space-time dimensions of the heap.

If speculative thread 203 for some reason encounters problems in executing method C 208, speculative thread 203 performs a rollback operation. This rollback operation allows speculative thread 203 to reattempt to execute method C 208. Alternatively, head thread 202 can execute method C 208 non-speculatively and speculative thread 203 can execute a subsequent method.

There are a number of reasons why speculative thread 203 may encounter problems in executing method C 208. One problem occurs when head thread 202 executing method B 206 writes a value to a memory element (object) after speculative thread 203 has read the same memory element. The same memory element can be read when the two space-time dimensions of the heap are collapsed at this memory element at the time of the read by speculative thread 203. In this case, speculative thread 203 should have read the value written by head thread 202, but instead has read a previous value. In this case, the system causes speculative thread 203 to roll back so that speculative thread 203 can read the value written by head thread 202.

Note that the term "memory element" generally refers to any unit of memory that can be accessed by a computer program. For example, the term "memory element" may refer to a bit, a byte or a word memory, as well as a data structure or an object defined within an object-oriented programming system.

Figure 3:
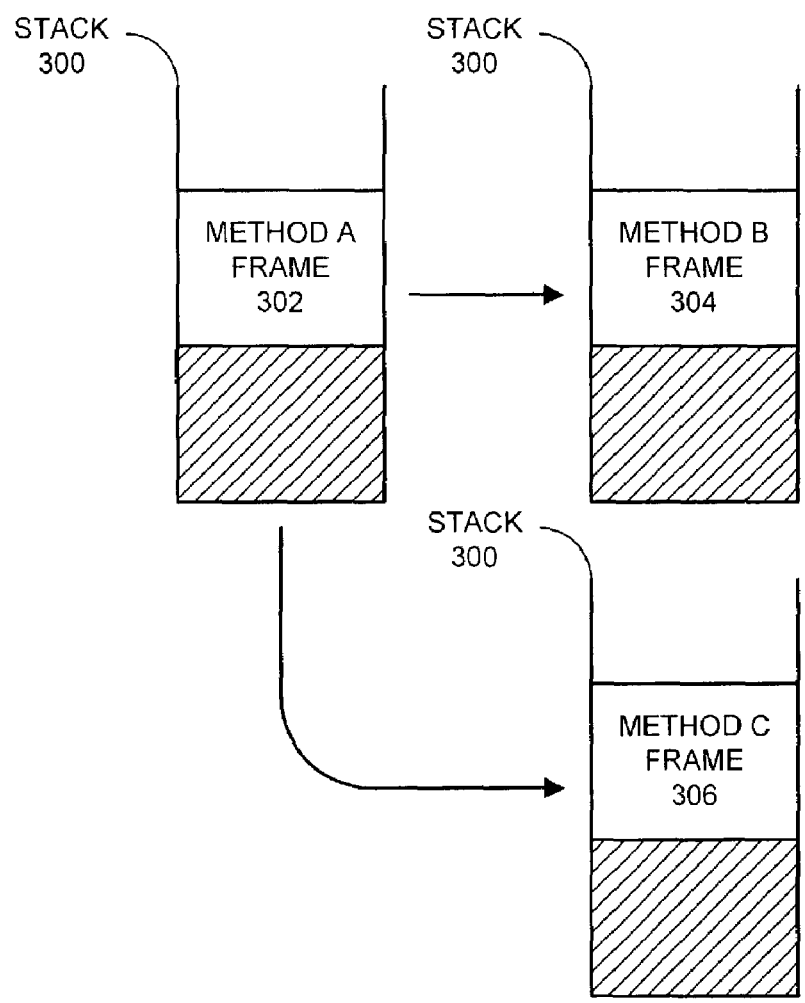
FIG. 3 illustrates the state of the system stack during space and time dimensional execution of a method in accordance with an embodiment of the present invention.

FIG. 3 illustrates the state of the system stack during space and time dimensional execution of a method in accordance with an embodiment of the present invention. Note that since programming languages such as the Java programming language do not allow a method to modify the stack frame of another method, the system stack will generally be the same before method B 206 is executed as it is before method C 208 is executed. (This is not quite true if method B 206 returns a parameter through the system stack. However, return parameters are can be explicitly dealt with as is described below.) Referring the FIG. 3, stack 300 contains method A frame 302 while method A 204 is executing. When method A 204 returns, method B 206 commences and method A frame 302 is replaced by method B frame 304. Finally, when method B 206 returns, method C 208 commences and method B frame 304 is replaced by method C frame 306. Note that since stack 300 is the same immediately before method B 206 executed as it is immediately before method C 208 is executed, it is possible to execute method C 208 using a copy of stack 300 without first executing method B 206.

In order to undo the results of speculatively executed operations, updates to memory need to be versioned. The overhead involved in versioning all updates to memory can be prohibitively expensive due to increased memory requirements, decreased cache performance and additional hardware required to perform the versioning.

Fortunately, not all updates to memory need to be versioned. For example, updates to local variables—such as a loop counter—on a system stack are typically only relevant to the thread that is updating the local variables. Hence, even for speculative threads versioning updates to these local variables is not necessary.

When executing programs written in conventional programming languages, such as C, it is typically not possible to determine which updates are related to the heap, and which updates are related to the system stack. These programs are typically compiled from a high-level language representation into executable code for a specific machine architecture. This compilation process typically removes distinctions between updates to heap and system stack.

The same is not true for new platform-independent computer languages, such as the JAVA™ programming language distributed by SUN Microsystems, Inc. of Palo Alto, Calif. (Sun, the Sun logo, Sun Microsystems, and Java are trademarks or registered trademarks of Sun Microsystems, Inc. in the United States and other countries.) A program written in the Java programming language is typically compiled into a class file containing Java byte codes. This class file can be transmitted over a computer network to a distant computer system to be executed on the distant computer system. Java byte codes are said to be "platform-independent," because they can be executed across a wide range of computing platforms, so long as the computing platforms provide a Java virtual machine.

A Java byte code can be executed on a specific computing platform by using an interpreter or a just in time (JIT) compiler to translate the Java bytecode into machine code for the specific computing platform. Alternatively, a Java byte code can be executed directly on a Java bytecode engine running on the specific computing platform.

Fortunately, a Java bytecode contains more syntactic information than conventional machine code. In particular, the Java bytecodes differentiate between accesses to local variables in the system stack and accesses to the system heap. Furthermore, programs written in the Java programming language do not allow conversion between primitive and reference types. Such conversion can make it hard to differentiate accesses to the system stack from accesses to the system heap at compile time.

Data Structures to Support Space-Time Dimensional Execution

Figure 4:
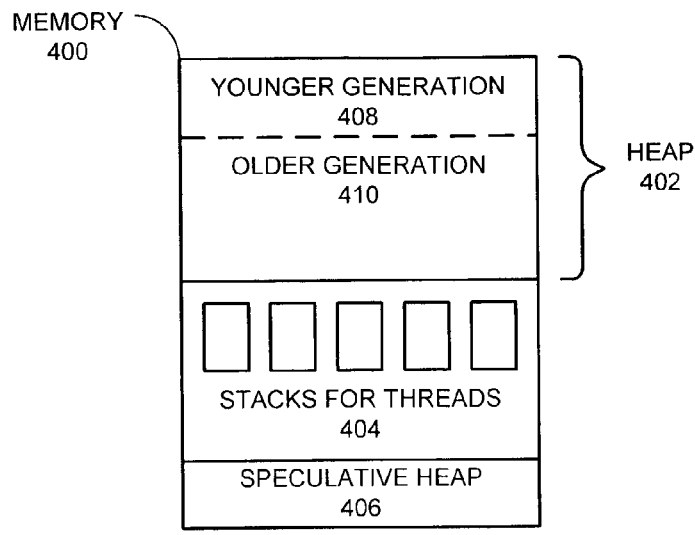
FIG. 4 illustrates how memory is partitioned between stack and heap in accordance with an embodiment of the present invention.
Figure 5:
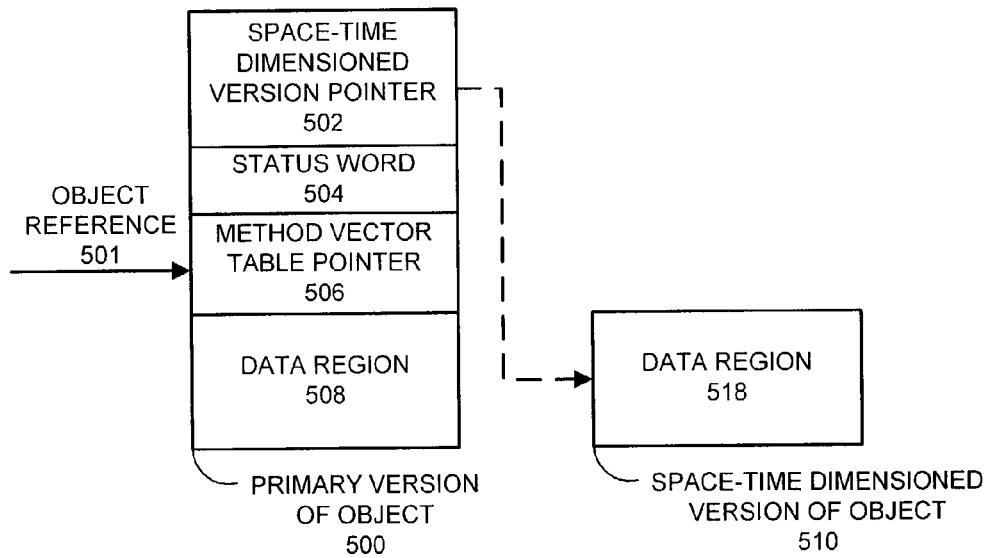
FIG. 5 illustrates the structure of a primary version and a space-time dimensioned version of an object in accordance with an embodiment of the present invention.

FIG. 4 illustrates how memory is partitioned between stack and heap in accordance with an embodiment of the present invention. In FIG. 4, memory 400 is divided into a number of regions including heap 402, stacks for threads 404 and speculative heap 406. Heap 402 comprises a region of memory from which objects are allocated. Heap 402 is further divided into younger generation region 408 and older generation region 410 for garbage collection purposes. For performance reasons, garbage collectors typically treat younger generation objects differently from older generation objects. Stacks for threads 404 comprise a region of memory from which stacks for various threads are allocated. Speculative heap 406 contains the space-time dimensioned values of all memory elements where the two space-time dimensions of the heap are not collapsed. This includes space-time dimensional versions of objects, for example, version 510 of object 500 as shown in FIG. 5, and objects created by speculative thread 203. For garbage collection purposes, these objects created by speculative thread 203 can be treated as belonging to a generation that is younger than objects within younger generation region 408.

FIG. 5 illustrates the structure of a primary version of object 500 and a space-time dimensioned version of object 510 in accordance with an embodiment of the present invention.

Primary version of object 500 is referenced by object reference pointer 501. Like any object defined within an object-oriented programming system, primary version of object 500 includes data region 508, which includes one or more fields containing data associated with primary version of object 500. Primary version of object 500 also includes method vector table pointer 506. Method vector table pointer 506 points to a table containing vectors that point to the methods that can be invoked on primary version of object 500. Primary version of object 500 also includes space-time dimensioned version pointer 502, which points to space-time dimensioned version of object 510, if the two space-time dimensions are not collapsed at this object. Note that in the illustrated embodiment of the present invention, space-time dimensioned version 510 is always referenced indirectly through space-time dimensioned version pointer 502. Primary version of object 500 additionally includes status word 504, which contains status information specifying which fields from data region 508 have been written to or read by speculative thread 203. Space-time dimensioned version of object 510 includes only data region 518.

Figure 6:
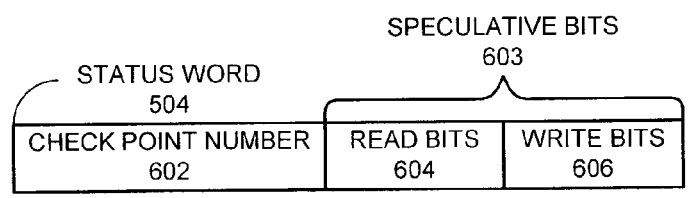
FIG. 6 illustrates the structure of a status word for an object in accordance with an embodiment of the present invention.

FIG. 6 illustrates the structure of status word 504 in accordance with an embodiment of the present invention. In this embodiment, status word 504 includes checkpoint number 602 and speculative bits 603. Speculative bits 603 includes read bits 604 and write bits 606. When status word 504 needs to be updated due to a read or a write by speculative thread 203, checkpoint number 602 is updated with the current time of the system. The current time in the time dimension of the system is advanced discretely at a join or a rollback. This allows checkpoint number 602 to be used as a qualifier for speculative bits 603. If checkpoint number 602 is less than the current time, speculative bits 603 can be interpreted as reset.

Read bits 604 keep track of which fields within data region 508 have been read since the last join or rollback. Correspondingly, write bits 606 keep track of which fields within data region 508 have been written since the last join or rollback. In one embodiment of the present invention, read bits 604 includes one bit for each field within data region 508. In another embodiment, read bits includes fewer bits than the number of fields within data region 508. In this embodiment, each bit within read bits 604 corresponds to more than one field in data region 508. For example, if there are eight read bits, each bit corresponds to every eighth field. Write bits 606 similarly can correspond to one or multiple fields within data region 508.

Space-Time Dimensional Update Process

Space-time dimensioning occurs during selected memory updates. For local variable and operand accesses to the system stack, no space-time dimensioned versions exist and nothing special happens. During read operations by head thread 202 to objects in the heap 402, again nothing special happens.

Special operations are involved in write operations by head thread 202 as well as read and write operations by speculative thread 203. These special operations are described in more detail with reference to FIGS. 7, 8 and 9 below.

Figure 7:
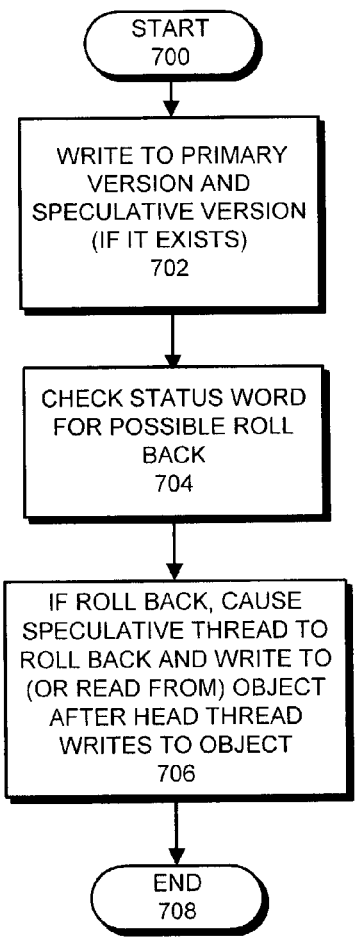
FIG. 7 is a flow chart illustrating operations involved in performing a write to a memory element by a head thread in accordance with an embodiment of the present invention.

FIG. 7 is a flow chart illustrating operations involved in a write operation to an object by a head thread 202 in accordance with an embodiment of the present invention. The system writes to the primary version of object 500 and the space-time dimensioned version of object 510 if the two space-time dimensions are not collapsed at this point (step 702). Next, the system checks status word 504 within primary version of object 500 to determine whether a rollback is required (step 704). A rollback is required if speculative thread 203 previously read the data element. The same memory element can be read when the two space-time dimensions of the heap are collapsed at this memory element at the time of the read by speculative thread 203. A rollback is also required if speculative thread 203 previously wrote to the object and thus ensured that the two dimensions of the object are not collapsed at this element, and if the current write operation updates both primary version of object 500 and space-time dimensioned version of object 510.

If a rollback is required, the system causes speculative thread 203 to perform a rollback operation (step 706). This rollback operation allows speculative thread 203 to read from (or write to) the object after head thread 202 writes to the object.

Note that in the embodiment of the present invention illustrated in FIG. 7 the system performs writes to both primary version 500 and space-time dimensioned version 510. In an alternative embodiment, the system first checks to determine if speculative thread 203 previously wrote to space-time dimensioned version 510. If not, the system writes to both primary version 500 and space-time dimensioned version 510. If so, the system only writes to primary version 500.

Figure 8:
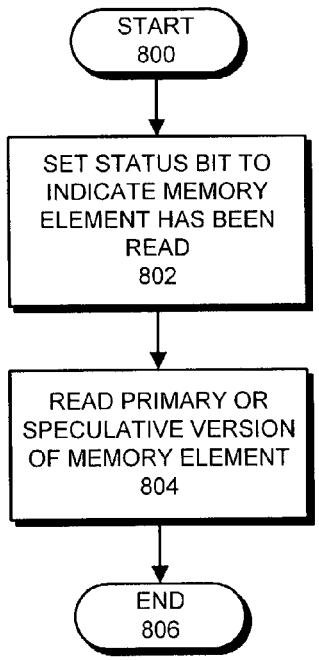
FIG. 8 is a flow chart illustrating operations involved in performing a read to a memory element by a speculative thread in accordance with an embodiment of the present invention.

FIG. 8 is a flow chart illustrating operations involved in a read operation to an object by speculative thread 203 in accordance with an embodiment of the present invention. During this read operation, the system sets a status bit in status word 504 within primary version of object 500 to indicate that primary version 500 has been read (step 802). Speculative thread 203 then reads space-time dimensioned version 510, if it exists. Otherwise, speculative thread 203 reads primary version 500.

Figure 9:
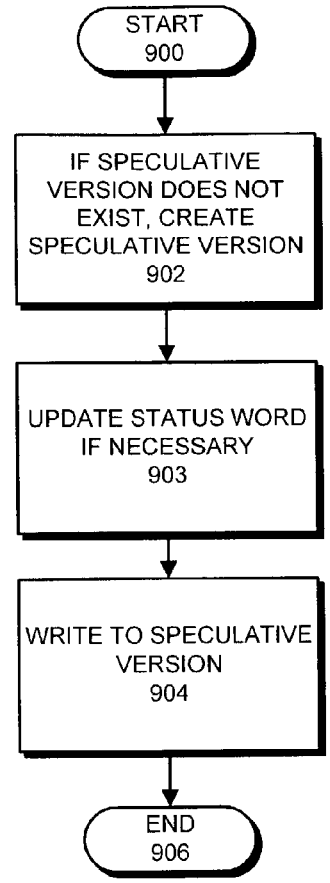
FIG. 9 is a flow chart illustrating operations involved in performing a write to a memory element by a speculative thread in accordance with an embodiment of the present invention.

FIG. 9 is a flow chart illustrating operations involved in a write operation to a memory element by speculative thread 203 in accordance with an embodiment of the present invention. If a space-time dimensioned version 510 does not exist, the system creates a space-time dimensioned version 510 in speculative heap 406 (step 902). The system also updates status word 504 to indicate that speculative thread 203 has written to the object if such updating is necessary (step 903). The system next writes to space-time dimensioned version 510 (step 904). Such updating is necessary if head thread 202 must subsequently choose between writing to both primary version 500 and space-time dimensioned version 510, or writing only to primary version 500 as is described above with reference to FIG. 7.

Figure 10:
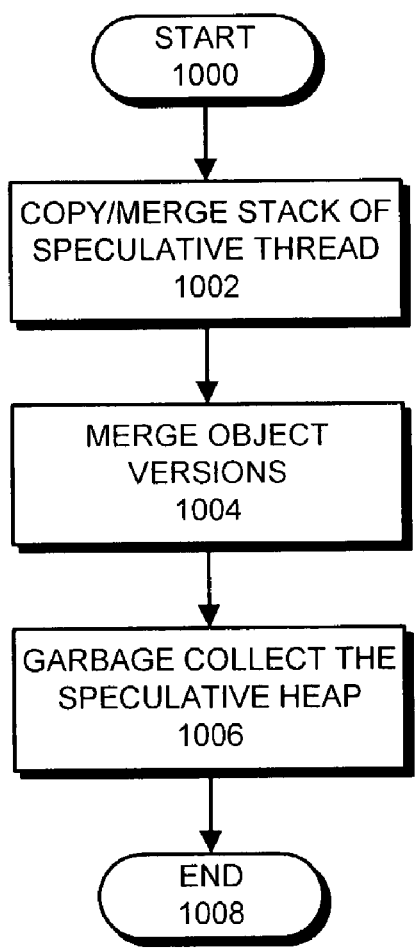
FIG. 10 is a flow chart illustrating operations involved in performing a join between a head thread and a speculative thread in accordance with an embodiment of the present invention.

FIG. 10 is a flow chart illustrating operations involved in a join operation between head thread 202 and a speculative thread 203 in accordance with an embodiment of the present invention. A join operation occurs for example when head thread 202 reaches a point in the program where speculative thread 203 began executing. The join operation causes state associated with the speculative thread 203 to be merged with state associated with the head thread 202. This involves copying and/or merging the stack of speculative thread 203 into the stack of head thread 202 (step 1002). It also involves merging space-time dimension and primary versions of objects (step 1004) as well as possibly garbage collecting speculative heap 406 (step 1006). In one embodiment of the present invention, one of threads 202 or 203 performs steps 1002 and 1006, while the other thread performs step 1004.

Figure 11:
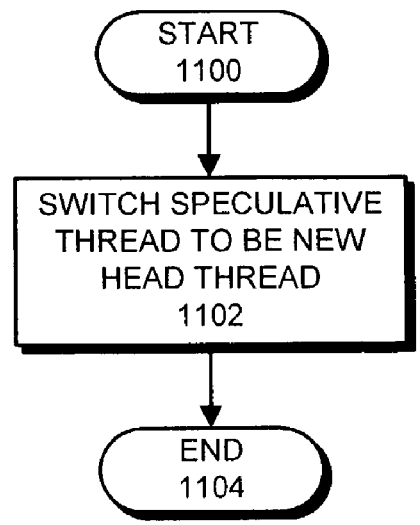
FIG. 11 is a flow chart illustrating operations involved in performing a join between a head thread and a speculative thread in accordance with another embodiment of the present invention.

FIG. 11 is a flow chart illustrating operations involved in a join operation between head thread 202 and a speculative thread 203 in accordance with another embodiment of the present invention. In this embodiment, speculative thread 203 carries on as a pseudo-head thread. As a pseudo-head thread, speculative thread 203 uses indirection to reference space-time dimensioned versions of objects, but does not mark objects or create versions. While speculative thread 203 is acting as a pseudo-head thread, head thread 202 updates primary versions of objects.

Extension to Additional Speculative Threads

Although the present invention has been described for the case of a single speculative thread, the present invention can be extended to provide multiple speculative threads operating on multiple space-time dimensioned versions of a data object in parallel.

Process of Setting Marking Bits

FIG. 12 is a flow chart illustrating the process of setting a marking bit associated with a referenced field within an object in accordance with an embodiment of the present invention. First, the system receives a reference to the field within the object (step 1202). This reference may be a read or a write operation. (Note that in the case of an array object the field is an array element.)

Next, the system identifies a marking bit associated with the field (step 1204). In one embodiment of the present invention, the system maintains a separate set of read marking bits 604 for the object to indicate that a read operation has occurred to the field, and a separate set of write marking bits 606 to indicate that a write operation has occurred to the field. In this embodiment, if the operation is a read operation, one of the read marking bits 604 is selected. Otherwise, one of the write marking bits 606 is selected.

In one embodiment of the present invention, the marking bit is identified by performing a modulo operation. For example, if the object includes N marking bits numbered 0, 1, 2, . . . , N−1 and M fields numbered 0, 1, 2, . . . , M−1, the system starts with a field number for the field, and applies a modulo N operation to the field number to produce a number for the associated marking bit. This modulo operation can be efficiently performed if N is a power of two because the modulo operation reduces to a simple bit mask operation that isolates the lower order bits of the field number.

The selection a value of N for an object involves a tradeoff. If N is too small, there tends to be lot of aliasing and system performance suffers due to false rollbacks. If N is too large, a great deal of memory is used for marking bits which can cause cache performance to suffer. In one embodiment of the present invention, N=8. In another embodiment, N=16.

In the case of an array object, the system applies a division operation to the array element number (field number) to identify the associated array element. For example, if the array object has N marking bits numbered 0, 1, 2, . . . , N−1 and M array elements numbered 0, 1, 2, . . . , M−1, the step of identifying the marking bit includes dividing the array element number by the ceiling of M/N to produce a number for the associated marking bit. If the ceiling of M/N is a power of two, the division operation can be accomplished by shifting the array index so that the most significant bits of the array index become the number for the associated marking bit.

The above-described mapping between array elements and marking bits for array objects associates consecutive array locations with a single marking bit. This ensures that not all of the marking bits are set by common block copy operations involving only a portion of the array.

After the marking bit is identified, the marking bit is set (step 1206) and the reference is performed to the field (or array element) within the object (step 1208).

In general the marking mechanism according to the present invention can be used in any application that must keep track of accesses to fields within an object. However, in one embodiment of the present invention, marking is performed for read operations by speculative thread 203. In another embodiment, marking is performed to write bits 606 during a write operation by speculative thread 203 and to read bits 604 during a read operation by speculative thread 203.

After the marking bits have been set, if a head thread 202 subsequently performs a write operation to a field in the object, head thread 202 can identify the associated marking bit using the above-described modulo or division operations. Next, the marking bit is extracted for examination purposes using a special bit extract operation that is part of the instruction set of the underlying computer system.

FIG. 13 illustrates how a marking bit number can be determined from a field number or an array element number in accordance with an embodiment of the present invention. The system starts with a field number or an array element number 1302. In the case of a field number, the system performs a modulo operation by masking off all but the lower order three bits of field number 1302 to produce a three bit index (1,0,0) that specifies a marking bit. In the case of an array index, the system performs a division operation by shifting array element number 1302 until only the three most significant bits (0,1,1) remain.

Figure 14:
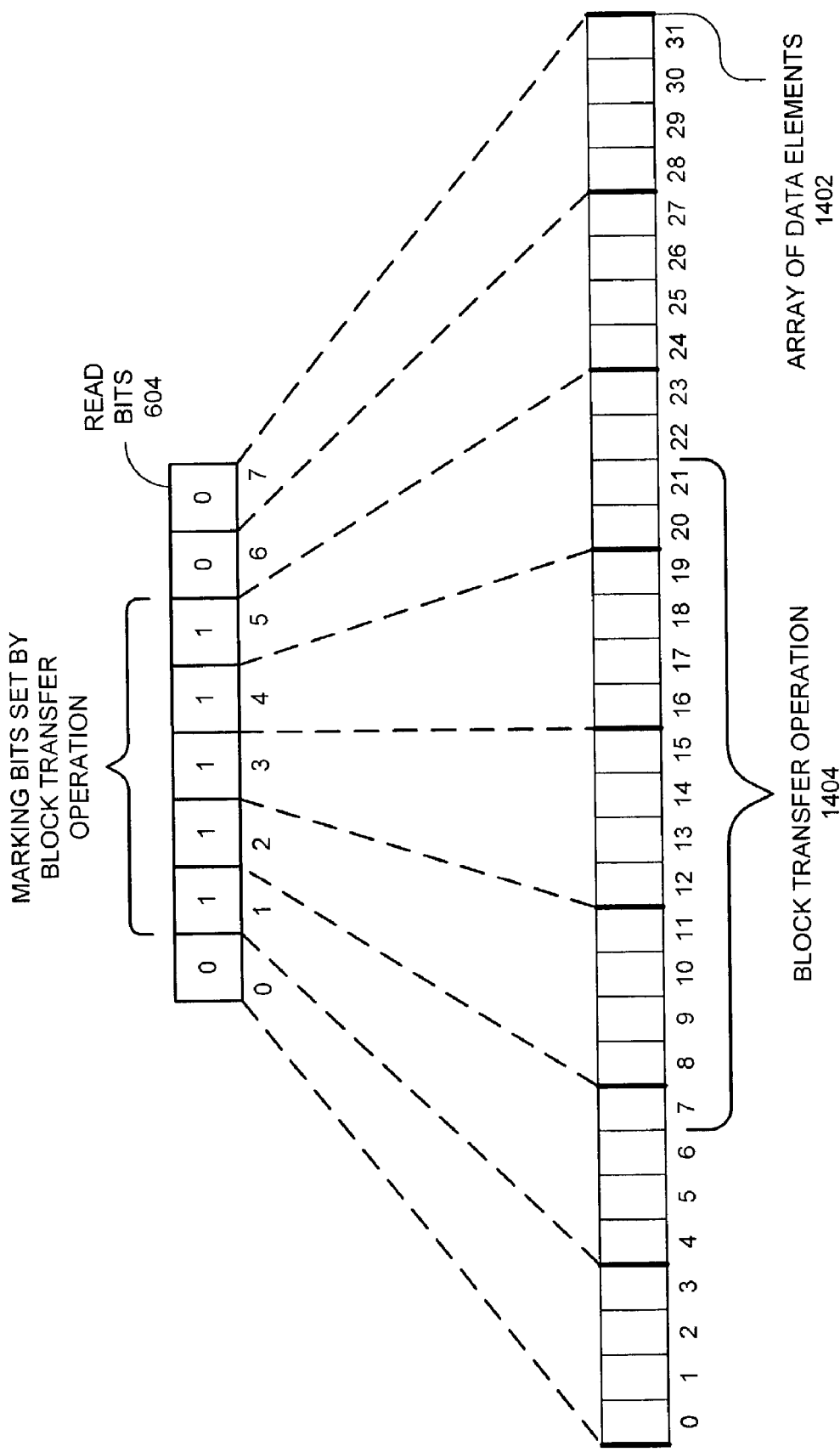
FIG. 14 illustrates how a block transfer operation can set multiple marking bits in accordance with an embodiment of the present invention.

FIG. 14 illustrates how a block transfer operation sets multiple marking bits in accordance with an embodiment of the present invention. The example illustrated in FIG. 14 includes an array of data elements 1402. These data elements are numbered 0, 1, 2, . . . , 31. FIG. 14 also includes an array of read bits 604. These read bits are numbered 0, 1, 2, . . . , 7. In the case of a block transfer operation 1404 that reads array elements seven through 21, the system first determines that read bits one through five must be set. Next, the system sets read bits one through five. Finally, the system performs the block transfer operation.

Note that a typical block transfer operation accesses consecutive array elements and hence sets a consecutive block of read bits. A shift operation can be used in combination with a special byte shuffle operation provided by the underlying machine architecture to efficiently set a consecutive block of read bits. For example, the byte shuffle operation can be used to wrap around bits that overflow from the shift operation.

Process of Switching From Speculative to Primary Version of Program

Figure 15:
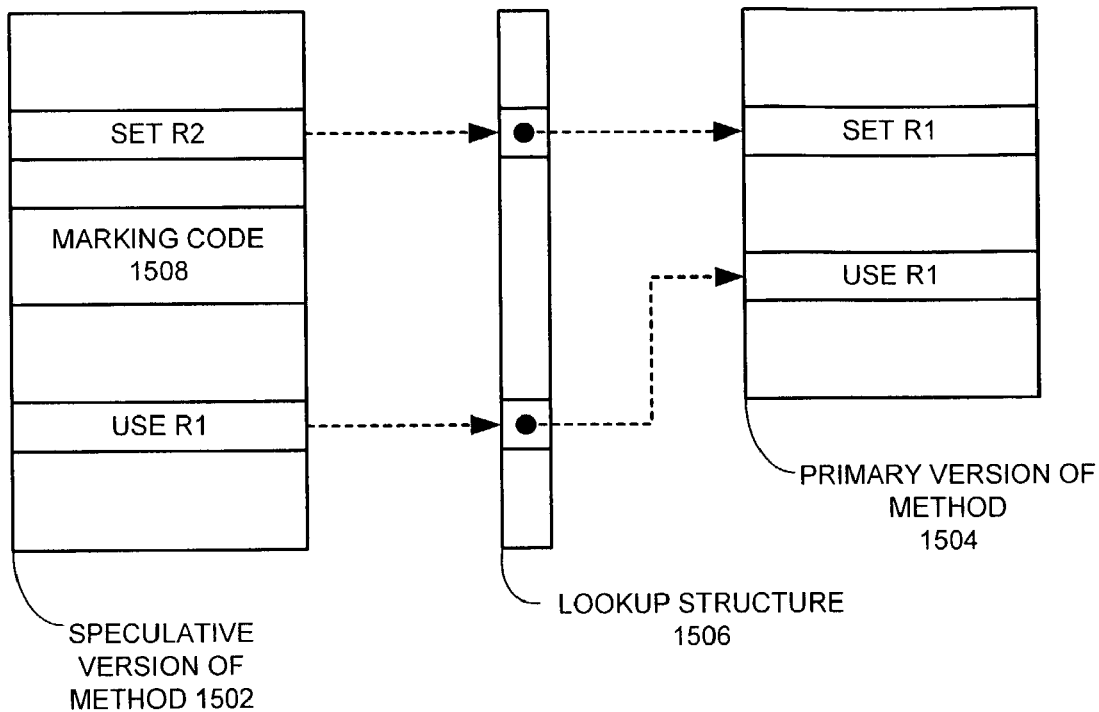
FIG. 15 illustrates how the speculative thread switches from executing a primary version of a method to executing a speculative version of the method in accordance with an embodiment of the present invention.

FIG. 15 illustrates how speculative thread 203 switches from executing the primary version of a method 1504 to executing a speculative version of the method 1502 in accordance with an embodiment of the present invention. During the compilation process, each method is compiled into a primary version 1504 and a speculative version 1502. The compiler also produces a lookup structure 1506 for translating between addresses in the speculative version of the method 1502 and addresses in the primary version of the method 1504. This enables the system to switch rapidly from executing instructions in the speculative version of the method 1502 to executing corresponding instructions in the primary version of the method 1504. Note that speculative version 1502 is larger than the primary version 1504, because speculative version 1502 includes additional code, including marking code 1508 to perform marking operations.

Also note that the size of lookup structure 1506 can be reduced by storing offsets into the primary version of the method 1504 instead of storing entire addresses.

In one embodiment of the present invention, the switching operation only takes place at pre-determined "join points" within the method. In this embodiment, lookup structure 1506 can be smaller because it only has to keep track of address translations for the join points.

Referring the FIG. 15, note that the instruction SET R1 in the speculative version of the 1502 is mapped to a corresponding instruction SET R1 in the primary version of the method 1504. Similarly, note that the instruction USE R1 in the speculative version of the method 1502 is mapped to a corresponding instruction USE R1 in the primary version of the method 1504.

Figure 16:
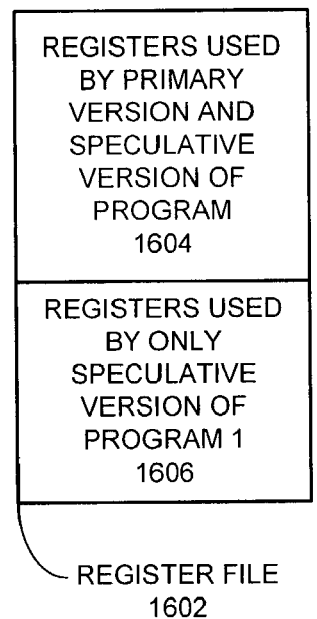
FIG. 16 illustrates how the register allocator partitions the register file to facilitate switching between program versions in accordance with an embodiment of the present invention.

FIG. 16 illustrates how the register allocator within the compiler partitions the register file 1602 to facilitate switching between program versions in accordance with an embodiment of the present invention. Note that if the register allocator is careful, after the switching operation completes, the primary version of the method 1504 is able to use the same registers that were used by the speculative version of the method 1502. In order to accomplish this, the register allocator can partition register file 1602 into (1) a set of registers 1604 used by both the primary version of the method 1504 and the speculative version of the method 1502, and (2) a set of registers 1606 used by only the speculative version of the method 1502. The register allocator additionally ensures that registers within the set of registers 1604 are used in the same way by the primary version of the method 1504 and the speculative version of the method 1502. Note that the additional marking code 1508 within the speculative version of the method 1502 uses the other set of registers 1606. Once the register allocator achieves this allocation, transforming from the speculative version to the head version requires a simple jump (change of program counter) and no saving or restoring of registers is required.

Also note that the technique of partitioning register file 1602 is only one of a number of possible ways to facilitate switching between program versions. In general, the register allocator only has to ensure that the primary version of the method 1504 can use the register state left by the speculative version of the method 1502 at any of the join points.

Figure 17:
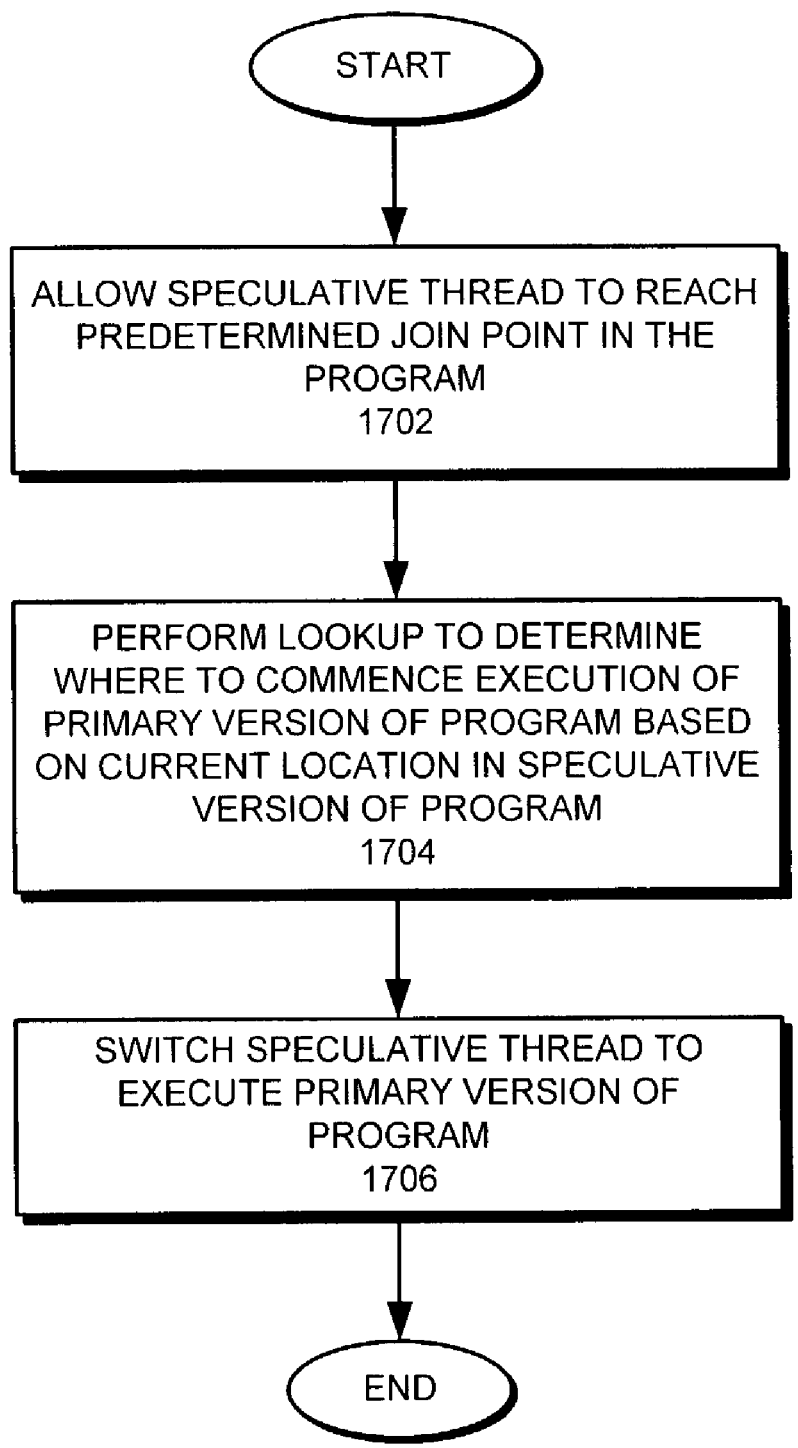
FIG. 17 is a flow chart illustrating the process of switching the speculative thread to become a new head thread in accordance with an embodiment of the present invention.

FIG. 17 is a flow chart illustrating the process of switching speculative thread 203 to become a new head thread in accordance with an embodiment of the present invention. The system first (optionally) allows speculative thread 203 to reach a predetermined join point in the program (step 1702). Next, the system performs a lookup into lookup structure 1506 to determine where to commence execution in the primary version of the method 1504. This lookup is based upon the current point of execution within the speculative version of the method 1502 (step 1704). Finally, the system switches speculative thread 203 so that it executes the primary version of the method 1504 instead of executing the speculative version of the method 1502 (step 1706).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer implemented method that facilitates efficient join operations between a head thread and a speculative thread in a system that supports speculative program execution, wherein the head thread operates on primary versions of memory elements and accesses a primary version of a stack and the speculative thread operates on space-time dimensioned versions of the memory elements and accesses a speculative version of the stack, the method comprising:
executing a primary version of a program using the head thread;
executing a speculative version of the program using the speculative thread; and
performing a join operation between the head thread and the speculative thread when the head thread reaches a point in the program where the speculative thread began executing, wherein performing the join operation involves, merging the space-time dimensioned versions of the memory elements into the primary versions of the memory elements so that updates to the space-time dimensioned versions of the memory elements are incorporated into corresponding primary versions of memory elements, and merging the speculative version of the stack into the primary version of the stack;

wherein performing the join operation involves causing the speculative thread to act as a new head thread by performing a switching operation to switch from executing the speculative version of the program to executing the primary version of the program;

wherein performing the switching operation involves performing a lookup to determine where the new head thread is to commence executing the primary version of the program based upon where the speculative thread is currently executing within the speculative version of the program; and wherein if the speculative thread performs a write operation to a memory element, the method further comprises:

determining if the space-time dimensioned version of the memory element exists, if the space-time dimensioned version of the memory element does not exist, creating the space-time dimensioned version of the memory element, and performing the write operation to the space-time dimensioned version of the memory element.

2. The computer implemented method of claim 1, wherein performing the switching operation involves allowing the speculative thread to continue executing until it reaches a predetermined join point within the speculative version of the program before switching to executing the primary version of the program.

3. The computer implemented method of claim 1, wherein performing the lookup involves performing the lookup in a data structure that identifies locations in the primary version of the program that correspond to locations in the speculative version of the program.

4. The computer implemented method of claim 1, wherein executing the speculative version of the program involves ensuring that the speculative thread uses registers in such a manner that when the switching operation takes place, the new head thread can use data values in the registers without having to move the data values between the registers.

5. The computer implemented method of claim 4, wherein a register allocator partitions a register file into:

a set of registers that are used by the head thread and the speculative thread; and a set of registers that are used only by the speculative thread.

6. The computer implemented method of claim 1, wherein if the speculative thread performs a read operation to a memory element, the method further comprises:

determining if the space-time dimensioned version of the memory element exists;

if the space-time dimensioned version of the memory element exists, reading the space-time dimensioned version of the memory element;

if the space-time dimensioned version of the memory element does not exist, reading the primary version of the memory element; and updating status information associated with the memory element to indicate the memory element has been read by the speculative thread.

7. The computer implemented method of claim 1, wherein if the head thread performs a write operation to a memory element, the method further comprises:

performing the write operation to the primary version of the memory element;

checking status information associated with the memory element to determine if the memory element has been read by the speculative thread;

if the memory element has been read by the speculative thread, causing the speculative thread to roll back so that the speculative thread can read a result of the write operation; and if the memory element has not been read by the speculative thread, performing the write operation to the space-time dimensioned version of the memory element if the space-time dimensioned version exists.

8. The computer implemented method of claim 1, wherein the memory elements include objects defined within an object-oriented programming system.

9. A computer-readable storage medium storing instructions that when executed by a computer cause the computer to perform a method that facilitates efficient join operations between a head thread and a speculative thread in a system that supports speculative program execution, wherein the head thread operates on primary versions of memory elements and accesses a primary version of a stack and the speculative thread operates on space-time dimensioned versions of the memory elements and accesses a speculative version of the stack the method comprising:

executing a primary version of a program using the head thread;

executing a speculative version of the program using the speculative thread; and performing a join operation between the head thread and the speculative thread when the head thread reaches a point in the program where the speculative thread began executing, wherein performing the join operation involves, merging the space-time dimensioned versions of the memory elements into the primary versions of the memory elements so that updates to the space-time dimensioned versions of the memory elements are incorporated into corresponding primary versions of memory elements, and merging the speculative version of the stack into the primary version of the stack;

wherein performing the join operation involves causing the speculative thread to act as a new head thread by performing a switching operation to switch from executing the speculative version of the program to executing the primary version of the program;

wherein performing the switching operation involves performing a lookup to determine where the new head thread is to commence executing the primary version of the program based upon where the speculative thread is currently executing within the speculative version of the program; and wherein if the speculative thread performs a write operation to a memory element, the method further comprises:

determining if the space-time dimensioned version of the memory element exists, if the space-time dimensioned version of the memory element does not exist, creating the space-time dimensioned version of the memory element, and performing the write operation to the space-time dimensioned version of the memory element.

10. The computer-readable storage medium of claim 9, wherein performing the switching operation involves allowing the speculative thread to continue executing until it reaches a predetermined join point within the speculative version of the program before switching to executing the primary version of the program.

11. The computer-readable storage medium of claim 9, wherein performing the lookup involves performing the lookup in a data structure that identifies locations in the primary version of the program that correspond to locations in the speculative version of the program.

12. The computer-readable storage medium of claim 9, wherein executing the speculative version of the program involves ensuring that the speculative thread uses registers in such a manner that when the switching operation takes place, the new head thread can use data values in the registers without having to move the data values between the registers.

13. The computer-readable storage medium of claim 12, wherein a register allocator partitions a register file into:
  a set of registers that are used by the head thread and the speculative thread; and
  a set of registers that are used only by the speculative thread.

14. The computer-readable storage medium of claim 9, wherein if the speculative thread performs a read operation to a memory element, the method further comprises:
  determining if the space-time dimensioned version of the memory element exists;
  if the space-time dimensioned version of the memory element exists, reading the space-time dimensioned version of the memory element;
  if the space-time dimensioned version of the memory element does not exist, reading the primary version of the memory element; and
  updating status information associated with the memory element to indicate the memory element has been read by the speculative thread.

15. The computer-readable storage medium of claim 9, wherein if the head thread performs a write operation to a memory element, the method further comprises:
  performing the write operation to the primary version of the memory element;
  checking status information associated with the memory element to determine if the memory element has been read by the speculative thread;
  if the memory element has been read by the speculative thread, causing the speculative thread to roll back so that the speculative thread can read a result of the write operation; and
  if the memory element has not been read by the speculative thread, performing the write operation to the space-time dimensioned version of the memory element if the space-time dimensioned version exists.

16. The computer-readable storage medium of claim 9, wherein the memory elements include objects defined within an object-oriented programming system.

17. An apparatus that facilitates efficient join operations between a head thread and a speculative thread in a system that supports speculative program execution, wherein the head thread operates on primary versions of memory elements and accesses a primary version of a stack and the speculative thread operates on space-time dimensioned versions of the memory elements and accesses a speculative version of the stack, the apparatus comprising:
  an execution mechanism that is configured to,
    execute a primary version of a program using the head thread, and to
    execute a speculative version of the program using the speculative thread;
  a join mechanism that is configured to perform a join operation between the head thread and the speculative thread when the head thread reaches a point in the program where the speculative thread began executing, wherein performing the join operation involves,
    merging the space-time dimensioned versions of the memory elements into the primary versions of the memory elements so that updates to the space-time dimensioned versions of the memory elements are incorporated into corresponding primary versions of memory elements, and
    merging the speculative version of the stack into the primary version of the stack;
  a switching mechanism within the join mechanism that is configured to cause the speculative thread to act as a new head thread by performing a switching operation to switch from executing the speculative version of the program to executing the primary version of the program; and
  wherein the switching mechanism is configured to perform a lookup to determine where the new head thread is to commence executing the primary version of the program based upon where the speculative thread is currently executing within the speculative version of the program; and
  wherein if the speculative thread performs a write operation to a memory element, the method further comprises:
    determining if the space-time dimensioned version of the memory element exists,
    if the space-time dimensioned version of the memory element does not exist, creating the space-time dimensioned version of the memory element, and
    performing the write operation to the space-time dimensioned version of the memory element.

18. The apparatus of claim 17, wherein the switching mechanism is configured to allow the speculative thread to continue executing until it reaches a predetermined join point within the speculative version of the program before switching to executing the primary version of the program.

19. The apparatus of claim 17, wherein the switching mechanism is configured to perform the lookup in a data structure that identifies locations in the primary version of the program that correspond to locations in the speculative version of the program.

20. The apparatus of claim 17, wherein while executing the speculative version of the program, the speculative version of the program is configured to ensure that the speculative thread uses registers in such a manner that when the switching operation takes place the new head thread can use data values in the registers without having to move the data values between the registers.

21. The apparatus of claim 20, wherein a register allocator partitions a register file into:
  a set of registers that are used by the head thread and the speculative thread; and
  a set of registers that are used only by the speculative thread.

* * * * *